United States Patent Office 2,751,169
Patented June 19, 1956

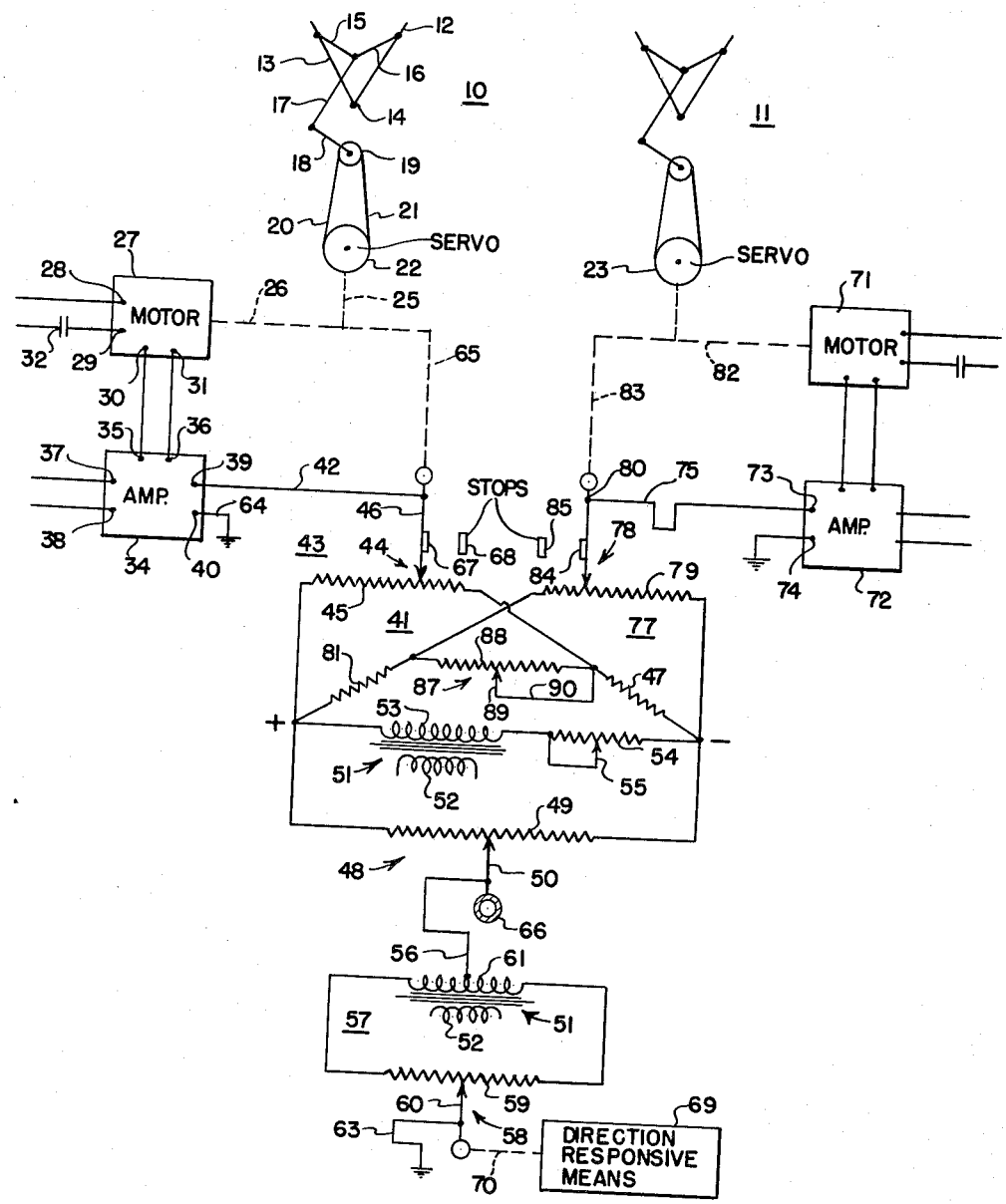

2,751,169
AUTOMATIC STEERING APPARATUS

Robert J. Kutzler, Minneapolis, Minn., assignor to Minneapolis-Honeywell Regulator Company, Minneapolis, Minn., a corporation of Delaware Application May 24, 1950, Serial No. 163,871

15 Claims. (Cl. 244—77)

This invention pertains to steering mechanisms for dirigible craft such as aircraft and the like. The invention is an improvement in the type of steering mechanisms disclosed in my prior application Serial No. 38,272 of July 12, 1948, for United States patent, now Patent No. 2,633,313, dated March 31, 1953.

In the type of steering mechanism therein disclosed it was found desirable to sequentially operate the motors that operate two rudder control surfaces of an aircraft of a type having two rudder control surfaces that are mounted in the wings of the craft.

It is an object of this invention to provide for sequential operation of said rudder control motors but also to provide alternatively for overlapping operation thereof.

It is an object of this invention to control each rudder motor by a separate balanceable network having an unbalancing controller and a rebalancing controller with an adjustment means interconnecting the networks for oppositely shifting the control or balance points of said networks.

It is a further object to effect such shift in the balance points of two networks by a single manually operable controller.

It is an object of this invention to control the two rudders of an aircraft, which rudders have opposite effects on the attitude of said craft, by balanceable networks with a common device for the networks for varying simultaneously the ratio of the movements of the rudders to the movements of a control device.

The above and further objects of the invention will be more fully appreciated when associated with the following detailed description of a preferred embodiment of the invention. Such description is better visualized when read in conjunction with the accompanying drawing illustrating the said invention.

The sole figure is a schematic arrangement of the invention incorporated with a portion of an automatic steering mechanism to illustrate its use.

Referring to the drawing, apparatus is illustrated therein for controlling a Flying Wing type of aircraft. This type of aircraft has its attitude about its vertical axis controlled by two so called rudders 10 and 11 which are spaced from the longitudinal center line of the aircraft with each rudder mounted in the trailing edge of the wing of said craft. Designating the rudder 10 the left rudder and the rudder 11 the right rudder, the left rudder is operated from a hydraulic servomotor which in turn is controlled from an electric motor. The electric motor in turn is controlled by an electronic amplifier which is of the phase sensitive type. This amplifier is controlled by a balanceable network which includes a direction responsive means for sensing change in attitude of the aircraft about the vertical axis and a rebalancing means driven by the electric motor. The right rudder 11 is also operated from a hydraulic servomotor which is controlled by a separate electric motor. This motor in turn has its own amplifier which is controlled by its separate balanceable network which in turn includes the direction responsive means and a follow-up rebalancing means. The arrangement is such that while each amplifier network is responsive to the deviation responsive means and may be unbalanced in either of two directions, the motors controlled by the amplifiers normally are permitted to move in but one direction from a normal position in which normal position the rudder controlled by the respective motor is in a closed position. By the arrangement, the electric motors are operated sequentially when the deviation or direction responsive means shifts from one to the other side of a normal position about said vertical axis.

Under ordinary flying conditions the operation sequentially of the rudders for the Flying Wing aircraft is satisfactory for control of the craft. However, in some cases, each rudder when initially operated may have no effect on the attitude of the aircraft until it is adjusted to approximately five degrees from its normally closed position. It may therefore be desirable in order to reduce the time of response of the craft to a deviation to ordinarily maintain both rudders in a partially open position, illustrated in exaggerated manner, in order to have an immediate effect on the attitude of said craft upon further operation of said rudder.

Where it is desirable to normally maintain each rudder in a partly open position an arrangement has been provided which coacts with both networks which permits the carrying of a partly operated rudder and permits an overlap of the operation of both motors for small displacements of said rudders from closed positions.

The specific means by which the above general functions are attained are set for in the following detailed description.

The location of the rudders 10 and 11 with reference to the aircraft is fully disclosed in an application of David L. Markusen, Serial No. 691,632, filed August 19, 1946, now Patent No. 2,558,096, dated June 26, 1951. For illustrating the present invention, I have shown rudder 10 as consisting of two plate members 12 and 13 hinged about a common axis 14. Extending from member 13 and from member 12 are separate toggle links 15 and 16. These toggle links have their free ends pivoted together and the axis of said pivot supports one end of an actuating link 17 whose opposite end extends from a crank arm 18. The arm 18 is carried by a rotatable member 19 which is actuated by cables 20, 21 operated from a hydraulic servomotor 22.

The right rudder 11 is similarly constructed and is similarly operated from its separate hydraulic servomotor 23.

The hydraulic servomotor 22 may be of the type having a control valve which may be displaced relative to its chamber and when thus displaced causes operation of the servomotor and the rudder. The operation of the servomotor is accompanied by a follow-up drive which removes the relative displacement of the control valve with respect to its chamber and thus terminates operation of the hydraulic servomotor. The hydraulic servomotor thus may be of the type disclosed in the U. S. patent to Koster 2,137,942. The control valve (not shown) of the servomotor 22 is positioned by an operating connection 25 extending from a shaft 26 of the left rudder control motor 27. The motor 27 is of the capacitor type induction motor having line winding terminals 28, 29 and amplifier winding terminals 30, 31. Such motor includes a conventional rotor (not shown) which is connected to the output shaft 26 through speed reduction gearing. As well known, such motor rotates in one or another direction depending upon the phase relationship of the voltage across amplifier terminals 30, 31 with respect to the voltage across line terminals 28, 29. The line winding terminals 28, 29 may be connected through a phasing condenser 32 to a source of alternating voltage.

The motor 27 is controlled from an electronic amplifier having output terminals 35, 36; power source terminals 37, 38; and control circuit input terminals 39, 40. The terminals 37 and 38 are connected to a source of alternating voltage. The amplifier-motor combination may be similar to that disclosed in the patent to Beers 2,020275 Figure 2. It will thus be evident further that the direction of rotation of the motor 27 depends upon the phase relationship between the control signals applied to terminals 39, 40 and the voltage across the voltage source terminals 37, 38.

The amplifier input terminals 39, 40 are connected to a circuit which includes conductor 42, slider 46, a network 43, conductor 56, a network 57, ground lead 63, and amplifier ground lead 64. The balanceable network 43 includes a Wheatstone bridge 41 which has components common with a second Wheatstone bridge 77, to be described, said networks being interconnected by an adjustable resistance 87. The Wheatstone bridge 41 consists of a potentiometer 44 having a 1900 ohm resistor 45 and a slider 46, a 500 ohm fixed resistance 47, a trim potentiometer 48 having a 1000 ohm resistance 49 and a slider 50, a transformer 51 having a primary winding 52 and a secondary 53, and a variable resistor 54 of 2000 ohms. Resistance 45 has one end connected directly to one end of secondary winding 53. The opposite end of resistance 45 is connected in series with the 500 ohm resistance 47 and variable resistance 54 to the opposite end of secondary winding 53. The resistor 49 has one end connected directly to one end of secondary winding 53 and its opposite end connected to the junction of resistor 47 and resistor 54. The sliders 46 and 50 constitute the output members of the Wheatstone bridge. The slider 46 constitutes a follow-up means or rebalancing voltage deriving controller and is positioned from shaft 26 of motor 27 through a drive connection 65. The slider or selective controller 50 is manually adjustable from a centering knob 66. Slider 46 has mounted thereon a stop portion 67 which engages a stop 68 on the frame to limit movement of slider 46 and therefore motor 27 in one direction. Conductor 42 extends from amplifier terminal 39 to slider 46.

Network 57 includes a condition responsive potentiometer 58 having a resistor 59 and a slider 60 and also includes a transformer 51 having a primary winding 52 and a secondary winding 61. By indicating the same primary winding and transformer for the two networks 41 and 57 it is evident that the transformer has a common primary winding which supplies several secondary windings. Continuing with network 57, the resistor 59 is connected across the ends of secondary winding 61. Slider 60 of potentiometer 58 is positioned by a direction or heading responsive means 69 through an operating connection 70. Such direction responsive means may be any conventional directional gyroscope having its rotor mounted for rotation about a normally horizontal axis and having three degrees of angular freedom. The direction responsive means could also be a yaw rate gyroscope. Such rate gyroscope would sense the rate of yaw or the rate of change of attitude of aircraft about the vertical axis. Completing the control circuit, conductor 56 extends from slider 50 to center tap of secondary winding 61, and conductor 63 of network 57 extends from slider 60 to ground which is common with the ground of amplifier conductor 64.

The right rudder 11 may be operated from a hydraulic servomotor 23 which is similar to the left rudder servomotor 22. The servomotor 23 is controlled from a motor 71 which is similar to motor 27 with the distinction that the line winding of motor 71 is reversely or cross connected to the source of voltage to provide proper direction of rotation or operation. Proper operation could also be obtained by linkage arrangement and balance potentiometer wiring, without changing motor windings.

Motor 71 is controlled from an electronic amplifier 72 which is similar to the left rudder motor amplifier 34.

The amplifier 72 has control circuit input terminals 73, 74. The amplifier additionally includes output terminals connected to the motor 71 and power input terminals connected to the voltage source such as the ship's supply.

The input terminals 73, 74 are connected to a control circuit which includes conductor 75, Wheatstone bridge 77, conductor 56, network 57, network ground conductor 63, and the amplifier ground lead.

The network 77 comprises a right rudder rebalancing potentiometer 78 having a 1900 ohm resistor 79 and an adjustable slider 80, a 500 ohm fixed resistor 81, potentiometer 48, transformer 51, and variable resistor 54, the latter three having been previously described. The resistor 79 has one end connected to the junction of resistor 47 and variable resistor 54 and the opposite end of resistor 79 is connected in series with resistor 81 to the opposite end of secondary winding 53. The slider 80 is a follow-up means and is operatively positioned from output shaft 82 of motor 71 through an operating connection 83. The slider 80 is provided with a stop portion 84 which engages the fixed stop 85 on the frame the arrangement being such that with the right rudder 11 in closed position the portion 84 engages the stop 85. The two stops 68 and 85 comprise stop means for voltage controllers 46 and 80.

Interconnecting the Wheatstone bridge networks 41 and 77 as stated is an adjustable resistance or voltage changer 87 having a 2000 ohm resistor 88 and an adjustable tap 89. Resistor 88 has one end connected to the junction of 500 ohm resistor 81 and 1900 ohm resistor 79 and has its opposite end connected to the junction of 1900 ohm resistance 45 and 500 ohm resistance 47. The tap 89 has a conductor 90 extending therefrom and said conductor is connected to one end of the resistor 88 to permit shunting various portions of resistor 88. It will be apparent that when tap 89 is to the extreme left in the figure the entire resistance 88 is shunted.

*Operation*

In setting up the device, the rudders 10 and 11 may be considered in closed position. Sliders 60 and 50 are at the electrical centers of their resistors 59 and 49 respectively. The adjustable tap 89 is considered as being at its extreme left position. Slider 46 of rebalancing potentiometer 44 is at its extreme right position, and its stop portion 67 engages stop 68. The slider 80 of the rebalancing potentiometer 78 is at its extreme left position when its stop portion 84 engages fixed stop 85. The adjustable tap 55 of the variable ratio resistor 54 may be approximately in its mid position. With the adjustable elements of the arrangement positioned as stated, the voltage drop across resistor 45 is equal to that across the fixed resistor 47 since the right end of resistor 81 and the left end of resistor 47 are at the same potential and due to the symmetry of the networks 41, 77 and likewise the voltage drop across the resistor 79 is equal to the voltage drop across the fixed resistor 81. The slider 46 is at the same potential as slider 50 and likewise the slider 80 is at the same potential as slider 50. When thus arranged there is no potential difference across the output members of network 41 or 77 and since network 57 has its slider 60 in mid position where its potential is the same as the center tap of secondary winding 61 both input circuits to amplifiers 34 and 72 are in balanced condition.

If slider 50 of the trim potentiometer 48 be moved to the left with the craft on the ground so as to be unaffected by rudder movement, and we assume under the half cycle under consideration that the left end of secondary winding 53 is positive with respect to the right end as indicated by the signs, the slider 50 will be positive with respect to slider 46 and likewise will be positive with respect to slider 80. The input circuit of amplifier 34 being thus unbalanced the amplifier 34 operates and causes the motor 27 to operate the control valve linkage for servomotor 22 and to operate through its follow-up connection 65 the slider 46 of the rebalancing potentiometer 44 until the network 41 is balanced. This balance is obtained by positioning slider 46 to the left until its potential is the same as that of slider 50.

In setting up the arrangement, slider 80 of the rebalancing potentiometer 78 was against its stop 85. The signal supplied from network 77 due to the adjustment of slider 50, will cause the unbalance of the input circuit of amplifier 72 and hence tending to cause operation of motor 71. The operation of motor 71 is, however, prevented by stop 85. The hydraulic servomotor 23 will thus be unoperated.

If we now return the slider 50 to its original position, the input circuit of amplifier 34 is unbalanced in the opposite direction and operates the motor 27 in the reverse direction to cause the movement of slider 46 toward its normal position with its stop portion 67 engaging stop 68. Motor 71 as in the initial movement of slider 50 remains unoperated.

If we continue and move the slider 50 to the right of its normal position, slider 50 will be negative with respect to follow-up sliders 46 and 80. With the slider 46 engaging stop 68 this unbalance of both networks 41 and 77 while resulting in the operation of amplifiers 34 and 72 will merely result in the operation of motor 71 by its amplifier 72 and the resultant position of slider 80 toward the right to balance network 77. At the same time motor 71 operates on the valve mechanism for hydraulic servomotor 23 to operate the right rudder 11. It is thus apparent that the right and left rudders are operated in sequence as the slider 50 moves from its left position to normal and then to the right of normal. If slider 50 be returned to normal position, the input circuit of amplifier 72 is unbalanced in opposite direction resulting in the reverse movement of servomotor 71 and its slider 80 until stop portion 84 engages stop 85 at which time network 77 will be balanced.

While the sequential operation of the motors 27 and 71 has been explained with reference to the movement of manually operated slider 50, it is also apparent that sequential operation of the motors may be provided by the automatic adjustment of slider 60 by the direction responsive means from a position to the left of its normal position to a position to the right of its normal position.

The effect of adjustable resistance 87 will now be considered. Assume that the sliders are in their respective normal positions as originally arranged. If slider 60 be adjusted toward the left while slider 50 remains centered it is apparent that slider 46 will be negative relative to slider 60. The motor 27 will operate its rebalancing slider 46 to the left until the voltage between it and slider 50 is equal and opposite to that between slider 60 and the center tap of secondary 61 thereby to balance the network 43. The slider 80 of the right rebalancing potentiometer 78 remains against its stop 85. While as originally arranged the tap 89 of variable resistor 87 was at its extreme left where it shunted the entire resistor 88, we are concerned primarily with the effect of moving the tap 89 toward the right from its extreme left position. With the sliders 60 and 46 displaced toward the left from their normal positions and network 43 balanced, assume that tap 89 is moved toward the right from its left position. It will be appreciated that we have increased the resistance of the circuit extending from the left end of secondary winding 53 through fixed resistor 81, variable resistor 87, fixed resistor 47, variable resistor 54, to the right end of secondary winding 53. We assume that we have not altered the alternate path through resistor 47 extending from the left end of secondary winding 53 through the 1900 ohm resistor 45 and through resistor 47 and variable resistor 54 to the right end of secondary winding 53. With the resistance of one circuit through resistor 47 increased, the current through resistor 47 decreases. Thus the upper end of resistor 47 in the figure approaches the potential of the right end of resistor 54. In other words, the potential of the left end of resistor 47 becomes more negative or is decreased and thus the right end of 1900 ohm resistor 45 is also decreased.

The adjustment of tap 89 has also decreased the total current through resistor 81, the total current being derived from two paths, one including resistor 81 and 1900 ohm resistor 79 and the other path including resistor 81, variable resistor 87, fixed resistor 47. With the current through resistor 81 decreased, the right end of resistor 81 becomes more positive or approaches the potential of the left end of secondary 53 and thus the potential of the left end of the 1900 ohm resistor 79 which is common to the right end of resistor 81 also increases.

With the right end of resistor 45 decreased in potential due to the adjustment of tap 89, it will be necessary in order to balance the control circuit of amplifier 34 for the slider 46 to be moved to the left from its existing balancing position. In other words, the circuit of amplifier 34 is unbalanced by the adjustment of tap 89 and the amplifier 34 operates and causes the motor 27 to additionally position slider 46 toward the left. This positioning continues until the amplifier circuit is balanced. Assume now that we move slider 60 from its left position toward the right and in the direction of its normal position. The input circuit of amplifier 34 is unbalanced in an opposite direction causing the amplifier 34 and motor 27 to move slider 46 toward its right position.

It is important to note, however, that with the tap 89 as thus adjusted whereby the left end of resistor 79 is increased in potential, the slider 60 when moved toward the right and toward its normal position may reach a point actually to the left of normal when its potential is the same as slider 80. If we attempt now to move slider 60 additionally toward the right to its normal position, its potential will be negative with respect to slider 80 thereby resulting in an unbalance of the control circuit and the operation of amplifier 72 and the motor 71 to displace the slider 80 until the amplifier input circuit is balanced and simultaneously through the right servomotor 23 positions the right rudder 11.

It is thus apparent that during the operation of slider 60 we can adjust tap 89 so that we can achieve a balance point in the input circuits of amplifiers 34 and 72 wherein both sliders 46 and 80 are displaced from their respective stops 68 and 85 and thus both the left rudder 10 and the right rudder 11 will be in operated position. The amount of opening of each rudder is dependent upon the displacement of slider 60 and the adjustment of tap 89. We can adjust the rudders 10 and 11 to such an extent of opening that upon a change in the position of slider 60 calling for corrective action further opening of one of the rudders can immediately effect a change in attitude of the aircraft about the vertical axis.

It is also apparent that by means of the adjustable tap 89 we have changed the operation of the motors 27 and 71 from one of sequential to partial overlapping operation.

We have also included in the arrangement an adjustment whereby the amount of rudder movement for a given input control signal may be varied. This input control signal is automatically derived from the potentiometer 58. If the network 57 be unbalanced by the operation of slider 60 toward the left the input circuit of amplifier 34 will be unbalanced and the amplifier 34 will operate the motor 27 which positions slider 46 to balance the input circuit. The amplifier 72 while operating at this time cannot for reasons stated cause the rotation of motor 71 if we assume that the slider 80 is engaged with stop 85.

If we now adjust the tap 55 of ratio resistor 54 so that we increase the resistance thereof in the energizing circuit which includes secondary winding 53 the voltage drop across resistor 45 of the rebalance potentiometer 44 will decrease. In order to balance the signal from network 57 it will therefore be necessary for the motor 27 to adjust slider 46 additionally toward the left to provide a signal sufficient to balance the signal from network 57 and also cause additional movement of the left rudder. Obviously, if slider 55 be moved in the opposite direction from its position illustrated to decrease the resistance in the energizing circuit including secondary 53 the voltage drop per unit length of resistor 45 will increase which will require less movement of motor 27 and slider 46 to balance the signal from network 57.

This same ratio change of control surface movement with respect to input signal is simultaneously applied to network 77 so that the amount of movement of rudder 11 in response to a control signal from network 57 is also automatically achieved.

It will now be apparent that there has been provided an improved steering apparatus for a Flying Wing type of aircraft wherein the normal trim position of the rudders included in said apparatus may be effected by a single adjustable member. Further, that with the rudders as thus trimmed, the dynamic stability of the aircraft is increased in that overlapping operation of said rudders is thereby achieved which reduces time lag in control of the aircraft. While such control has been shown as applied to the rudders of an aircraft it is believed readily applicable to other devices for controlling a condition. It is believed that such other applications will now suggest themselves to those skilled in the art in view of the above description. Therefore, my invention is not to be limited to the precise embodiment disclosed but as defined by the appended claims.

What is claimed is:

1. Steering apparatus for an aircraft having two rudders for positioning said craft about the vertical axis thereof, said rudders when operated exerting an opposite effect on said craft's position, comprising: a separate power means adapted to position each rudder; a motor means for each power means for controlling its operation; a balanceable electrical impedance network for controlling each motor means, each network including a selective controller common to each balanceable electrical impedance network for deriving a voltage upon displacement from a normal position for unbalancing either network and a rebalancing voltage deriving controller driven by each motor means; stop means for limiting the adjustment of a rebalancing controller of one motor means when the said controller is moved in one direction and limiting the adjustment of the other rebalancing controller of the other motor means when the other controller is moved in the opposite direction, so that said motor means when said rebalancing controllers are against their stops are operative on opposite voltage signals from said common controller; a voltage changer interconnecting both networks; and means connected thereto for adjusting said voltage changer to oppositely vary the voltage of both rebalancing controllers for causing operation of both motor means in opposite directions within small selective controller displacements.

2. Apparatus for varying the operation relationship of a pair of motors, said apparatus comprising: a phase sensitive amplifier for each motor for reversibly controlling its operation; a separate balanceable electrical network for each amplifier, each network including a common operation initiating controller but separate operation terminating motor operated follow-up controller, all controllers generating a voltage proportional to their adjustment; stop means for oppositely limiting the adjustment of said follow up controllers whereby but one motor only is operative from stop engaging position despite unbalance of both networks by the adjustment of its initiating controller, and selective means connected to both networks for simultaneously oppositely adjusting the voltage of both follow-up controllers with said initiating controller displaced to cause further operation of said one motor, and upon reverse adjustment of the initiating controller operation of both motors simultaneously during a portion of the return movement of said controller.

3. A pair of balanceable networks comprising: two resistors connected in parallel across a source of voltage, a variable resistor connected between points on said two resistors at different potentials, a slider for each of said two resistors, a fourth resistor connected across said voltage source and having an adjustable slider, means for placing the sliders of the first two and the fourth resistor at the same voltage, and means for adjusting said variable resistor to vary oppositely the voltage of the fourth slider resistor with respect to said sliders of the first two resistors.

4. Control apparatus comprising: means responsive to a change in a condition in either direction from a normal value; a pair of balanceable systems; a pair of motors, each motor being controlled by a separate balanceable system of said pair; means adapted to operate a controlling device from each motor for controlling the condition, each said condition controlling device when operated from a normal position having an opposite effect on said condition; means for unbalancing both systems by said responsive means upon change from a normal condition; means for preventing the operation of all but one motor means on unbalance of said systems, the operation of said motor and its device tending to correct said condition; and an adjuster common to both balanceable systems for simultaneously varying the normal position of each motor so that each device is in partly operated position.

5. Control apparatus for an aircraft having two control surfaces for oppositely changing the attitude of said craft about an axis thereof, said apparatus comprising: a first motor for operating one surface; a second motor for operating the other surface; stop means for each motor; each surface normally being in unoperated position with each motor then engaging its stop means and being operable in but one direction from normal position; a balanceable control circuit for each motor with an adjustable controller common to both circuits and operable in either direction from a normal position to effect operation of the first or second motor, a follow-up controller driven by each motor to permit positioning the first or second motor in accordance with the position of said adjustable controller from its normal position, and means interconnecting said circuits and including an adjustable device for varying the normal positions of said motors to effect operation of the unoperated motor before said adjustable controller is returned to normal position.

6. Control apparatus comprising: a pair of induction motors; a phase sensitive amplifier for each motor to control its direction of rotation; a pair of balanceable electrical networks, a separate one controlling each amplifier; an operable controller movable from normal position for simultaneously unbalancing both networks; a follow-up controller driven by each motor for rebalancing its amplifier network; a stop engaged by each follow-up controller when said motor is in normal position to permit movement of said motor in but one direction from its normal position; adjustable means for decreasing the effect of a follow-up controller on its network for extending the amount of follow-up movement of an operated motor to effect balance of its network; and means controlled by said adjustable means and operative upon the follow-up controller of the network of the unoperated motor to increase its effect therein to cause operation of the unoperated motor before said operable controller is returned to its normal position.

7. The apparatus of claim 6 wherein said networks are a pair of balanceable resistance bridge networks.

8. The apparatus of claim 7 wherein said adjustable means is a variable resistor connected across intermediate portions of a pair of resistors in the separate networks.

9. A pair of balanceable bridge networks; means for unbalancing both networks; a separate means for rebalancing each network, and means interconnecting both networks for oppositely shifting the balance point of both said networks.

10. The apparatus of claim 9 wherein each rebalancing means comprises a motor means controlled by a network and which is operative on unbalance of the network to rebalance said network.

11. Control apparatus for an aircraft having two control surfaces laterally spaced from the longitudinal centerline of said craft and each exerting an opposite effect on the attitude of said craft about an axis, said apparatus comprising: attitude responsive means; a motor means for positioning each control surface; a balanceable potentiometer network for operatively controlling each motor means; means for operating a common potentiometer in each network for unbalancing each network from said attitude responsive means; a rebalancing means driven by each motor for operating a follow-up potentiometer for balancing its control network; and means interconnecting both networks for changing in opposite directions the balance points of said follow-up potentiometers in said networks.

12. Control apparatus comprising: a condition responsive device; a signal generator operated by said responsive device to provide a signal whose phase varies with the direction of change of said condition and whose magnitude varies in accordance with the degree of change of said condition; a first motor means adapted to operate one device from its unoperated position to alter said condition; a second motor means adapted to operate another device from its unoperated position to alter said condition in the other direction; means connecting said generator and both motor means for sequentially operating each motor means as the signal from the generator changes in phase; and further means in said connecting means movable in one direction for causing simultaneous operation of both motor means for small magnitudes of signals.

13. In combination with a plurality of condition regulating members; a condition responsive device; a plurality of motor means each having a balanceable circuit controlled by said device for moving said members in sequence in response to a change in condition in one direction and in reverse sequence in response to a reverse condition change, said members assuming modulated positions proportional to the unbalance of its motor means circuit during control thereof by said condition responsive device; and means connected to all balanceable circuits of said motor means and having an adjustable member which when moved in one direction effects overlapping operation of said condition regulating members when said condition approaches the desired value.

14. In combination with a plurality of condition regulating members; a condition responsive device; a plurality of motor means each having a self balancing control circuit controlled by said device to effect unbalance thereof for moving said members in sequence in response to a change in condition in one direction and in reverse sequence in response to a reverse direction of condition change, said members assuming modulated positions during control thereof by said condition responsive device; and means common to all balanceable circuits of said plurality of motor means for oppositely varying the balance points of all circuits for varying the modulated positions of said members during their control for a given change in said condition.

15. Condition control apparatus comprising: a pair of motor means, each having a follow-up responsive balanceable control network so that each motor means is adapted to impart modulating movements to a condition control device; a single condition responsive means connected to both networks for regulating sequentially the modulated movement of each motor means during different spaced portions of the range of action of said condition responsive means; and means common to both motor means networks to oppositely change the balance point of each network for causing overlap of said spaced portions to effect operation of both motor means in the overlapped portion.

References Cited in the file of this patent

UNITED STATES PATENTS

| | | |
|---|---|---|
| 609,639 | Wappler | Aug. 23, 1898 |
| 2,417,821 | Harcum et al. | Mar. 25, 1947 |
| 2,457,165 | McNamee | Dec. 28, 1948 |
| 2,462,081 | Esval | Feb. 22, 1949 |
| 2,474,441 | Sparrow | June 28, 1949 |
| 2,525,636 | Bedford et al. | Oct. 10, 1950 |
| 2,558,096 | Markusen | June 26, 1951 |
| 2,597,730 | Hornfeck | May 20, 1952 |